United States Patent
Marsh et al.

(10) Patent No.: US 7,535,381 B2
(45) Date of Patent: May 19, 2009

(54) CONVERTING VOICE WEATHER DATA INTO DATA FOR DISPLAY IN AN AIRCRAFT COCKPIT

(75) Inventors: Donald J. Marsh, Liberty, MO (US); Jeffrey K. Hunter, Olathe, KS (US); Timothy P. Gibson, Overland Park, KS (US)

(73) Assignee: Honeywell International Inc., Morristown, NJ (US)

(*) Notice: Subject to any disclaimer, the term of this patent is extended or adjusted under 35 U.S.C. 154(b) by 138 days.

(21) Appl. No.: 11/312,443

(22) Filed: Dec. 21, 2005

(65) Prior Publication Data

US 2007/0139222 A1    Jun. 21, 2007

(51) Int. Cl.
*G08B 23/00*    (2006.01)
*G01C 23/00*    (2006.01)

(52) U.S. Cl. .......................... 340/963; 701/3

(58) Field of Classification Search ........... 340/952, 340/953, 945–983, 539.28, 539.26; 701/3–18, 701/200–226; 342/26 D; 455/455–457, 455/460, 464, 511, 79, 90.1
See application file for complete search history.

(56) References Cited

U.S. PATENT DOCUMENTS

| | | | |
|---|---|---|---|
| 5,714,948 A | | 2/1998 | Farmakis et al. |
| 5,844,522 A | * | 12/1998 | Sheffer et al. ............... 342/457 |
| 6,000,942 A | * | 12/1999 | Hogue et al. .................. 434/30 |
| 6,154,143 A | | 11/2000 | Robinson |
| 6,356,209 B1 | | 3/2002 | Mitchell et al. |
| 6,380,869 B1 | * | 4/2002 | Simon et al. ................. 340/945 |
| 6,462,703 B2 | * | 10/2002 | Hedrick ....................... 342/120 |
| 6,728,522 B1 | * | 4/2004 | Marrah et al. ............. 455/179.1 |
| 6,828,922 B1 | * | 12/2004 | Gremmert et al. ........... 340/949 |
| 6,940,426 B1 | * | 9/2005 | Vaida .......................... 340/963 |
| 6,941,224 B2 | * | 9/2005 | Fukuyasu .................... 701/213 |
| 6,950,037 B1 | * | 9/2005 | Clavier et al. ............... 340/945 |
| 7,081,834 B2 | * | 7/2006 | Ruokangas et al. ......... 340/945 |
| 2002/0070852 A1 | * | 6/2002 | Trauner et al. .............. 340/438 |
| 2004/0181404 A1 | * | 9/2004 | Shedd ......................... 704/235 |
| 2005/0203676 A1 | | 9/2005 | Sandell et al. |

* cited by examiner

*Primary Examiner*—Jennifer Mehmood
(74) *Attorney, Agent, or Firm*—Fogg & Powers LLC

(57) ABSTRACT

A method of providing visual data to a pilot in an aircraft cockpit includes receiving information in the form of a voice signal, converting the information to visual data, and displaying the visual data to the pilot in the aircraft cockpit.

20 Claims, 2 Drawing Sheets

CONVERTING VOICE WEATHER DATA INTO DATA FOR DISPLAY IN AN AIRCRAFT COCKPIT

BACKGROUND OF THE INVENTION

1. Field of the Invention

The present invention relates to a system and method for converting weather data into display data for an aircraft cockpit. More particularly, the present invention involves transforming weather broadcast data into visual data displayable in an aircraft cockpit.

2. Discussion of the Related Art

Currently, a pilot must tune into a COM audio channel to receive voice recorded weather data. As such, a pilot is required to listen to, remember, and apply the weather information to their present aircraft situation. This process requires the pilot's attention and distracts the pilot from other aspects of aircraft operation. Moreover, the pilot must continually receive and account for updated weather information. However, overall safety is sacrificed either by requiring the pilot to continually devote time to obtaining voice recorded weather information at the expense of other pilot functions, or by not having current and updated weather conditions to apply to the aircraft operation.

Moreover, a pilot must also update their equipment manually, such as the altimeter with data concerning, for example, barometric pressure. Otherwise, the altimeter readings would be inaccurate.

SUMMARY OF THE INVENTION

It is to be understood that both the foregoing general description and the following detailed description are exemplary and explanatory and are intended to provide further explanation of the invention as claimed.

The present invention includes a method of providing visual weather data to a pilot in an aircraft cockpit. The method includes receiving weather information in the form of a voice signal; converting the information to visual data; and displaying the visual data to the pilot in the aircraft cockpit.

The present invention also provides a system for providing visual data to a pilot in an aircraft cockpit. The system includes a receiver for receiving information in the form of a voice signal; a converter for converting the information to visual data; and a display for displaying the visual data to the pilot in the aircraft cockpit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
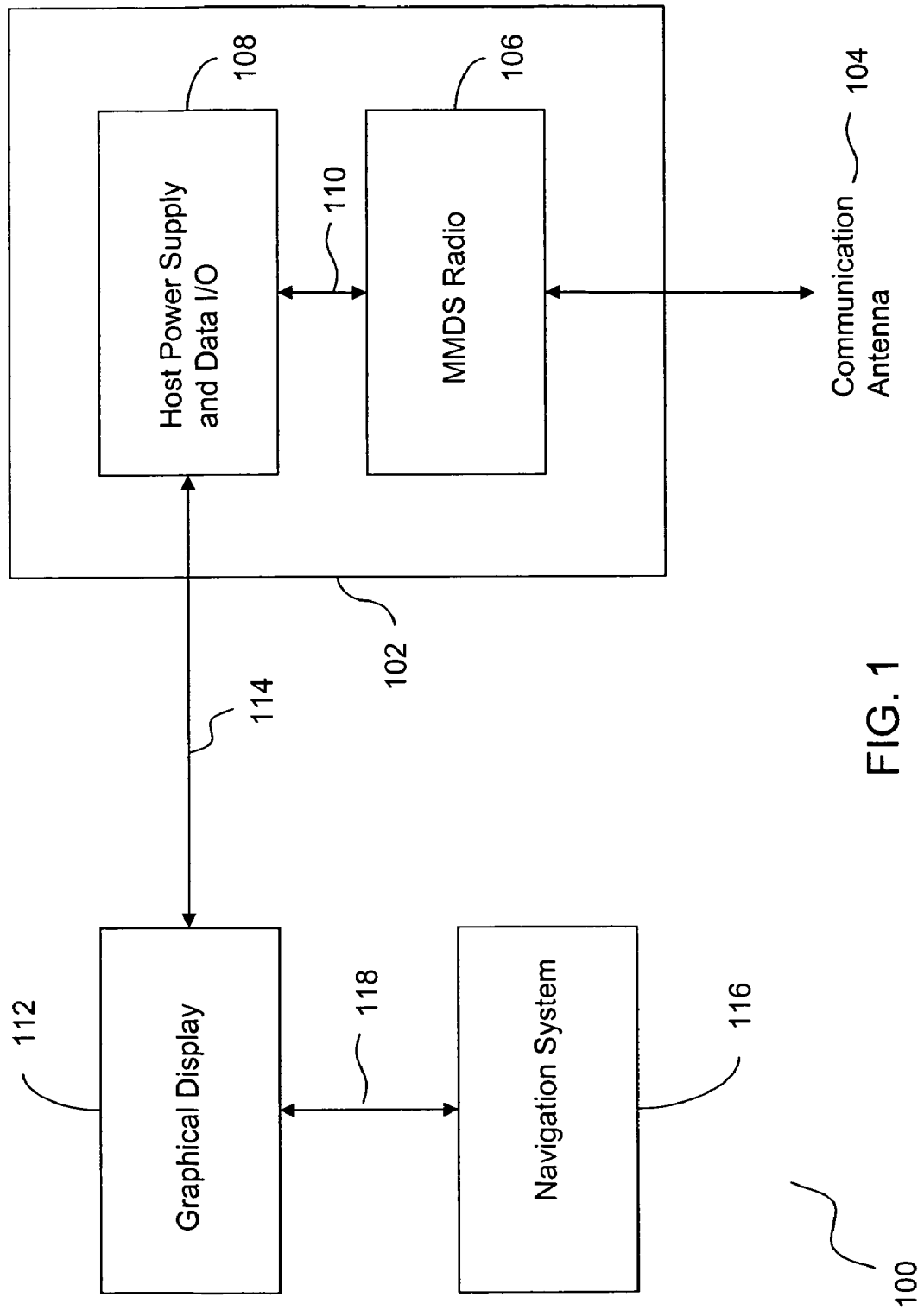
FIG. 1 illustrates an exemplary embodiment of the present invention.

FIG. 1 illustrates an exemplary embodiment of the system 100 of the present invention. The system 100 includes a processor 102 that includes a Multi-mode Digital Sensor (MMDS) radio 106 and host power supply and data I/O 108.

The MMDS radio 106 receives broadcast weather information in the form of a voice signal, over a radio channel at a given radio frequency via a communication antenna 104. The MMDS radio 106 converts the radio signal containing voice weather information into data and provides the data through the host power supply and data I/O 108 via, for example, a data bus 110, typically a Time Divisional Multiple Access (TDMA) data bus, to a graphical display 112 via, for example, an ARINC 429 data bus 114. The graphical display 112 converts the data into a visual display. The graphical display 112 also receives aircraft location information from a navigation system 116 via, for example, an ARINC 429 bus 114. The navigation system may include, for example, a Global Positioning System (GPS) and/or an inertial navigation system.

The MMDS radio 106 receives automated voice weather information broadcast from any number of sources, for example, the Automatic Surface Observing System (ASOS), the Automated Weather Observing System (AWOS), the Automatic Terminal Information Service (ATIS) and/or the Hazardous In-Flight Weather Advisory Service (HIWAS). The MMDS radio 106 converts the voice weather information, which is in the form of an analog or digital speech signal, into data, for example, a digital data information signal. The MMDS radio 106 can use off-the-shelf or well known voice recognition software to convert the voice weather information into digital information. For example, the MMDS radio 106 can be multi-person recognition software used by computer operated phone answering and routing systems.

The MMDS radio 106 can include a single channel COM radio. Alternately, the MMDS radio 106 can include a multi channel COM radio. The multi channel COM radio enables the MMDS radio 106 to receive data on more than one channel via a single antenna. In this way, the pilot can continue to operate on a non-weather channel, for example, to listen to tower communications, and contemporaneously receive weather information on a separate channel. It is also possible to receive weather information on more than one channel at a time. This enables the pilot to receive weather conditions for multiple locations in order to evaluate weather variation over a geographical area. As such, the pilot can modify the flight plan, if necessary. Receiving signals from multiple transmitting channels also enables the display of more comprehensive weather conditions.

Through the navigation system 116, the system 100 would be able to ascertain the present geographical position of the aircraft as well as projected positions of the aircraft. Thus, the system 100 may include a database containing weather transmitting stations around a particular region or around the world, as well as the radio frequencies over which each is broadcast. This would enable the MMDS radio 106 to automatically identify, based on present geographical and projected geographical positions, as well as automatically tune to one or more local weather transmitting broadcasts. It should be noted that the MMDS radio 106 may select from amongst several weather transmitting broadcasts based on geographical position (i.e., proximity to a weather broadcast transmission station) only, broadcast signal strength only, and/or a combination of geographical position and signal strength of any one or more other factors.

The graphical display 112 can include any manner or variety of methods to display weather information to a pilot. For example, the graphical display 112 can include graphs, icons, images, representations, figures and/or illustrations to convey weather information, such as an illustration of sky conditions, a weather radar display, or ground based weather radar display. The weather information can include, for example, wind speed, wind direction, precipitation, barometric pressure, air temperature, humidity, time information, due point temperature, cloud heights, precipitation types, and weather warnings, for example, potential icing conditions, area storms, high winds, lightning and tornados.

Figure 2A:
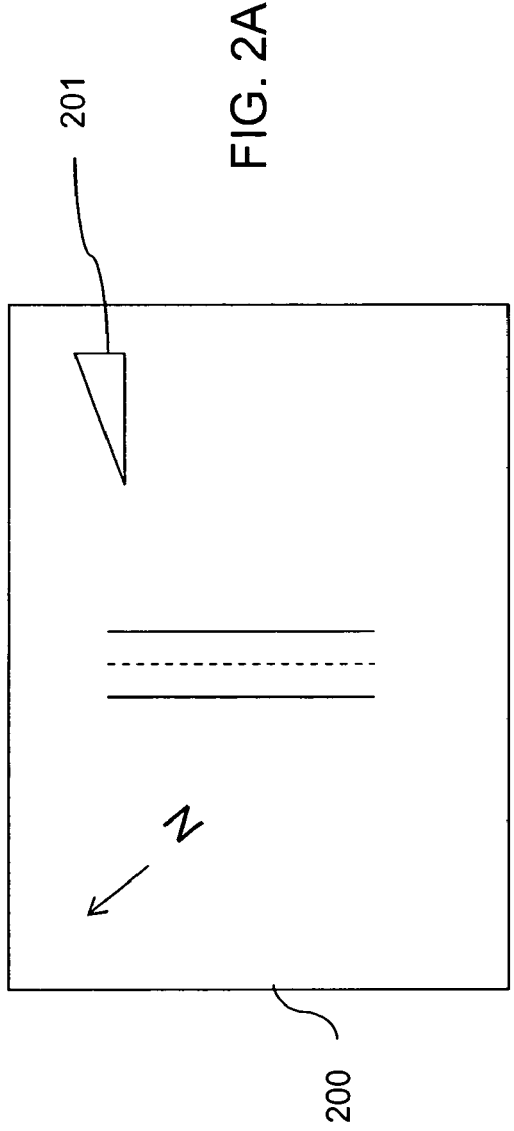
FIGS. 2A and 2B illustrate exemplary displays of the present invention.
Figure 2B:
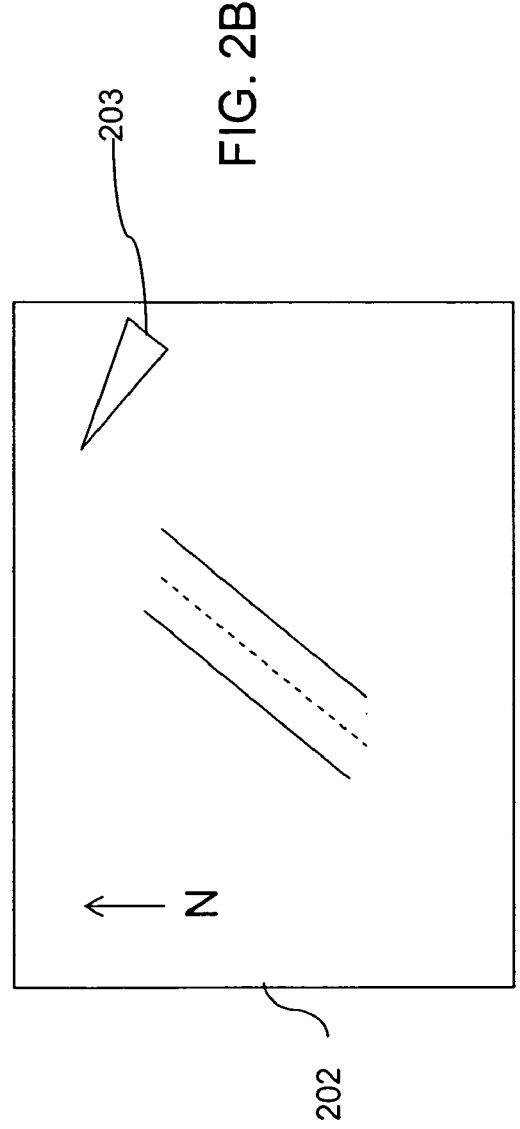

One exemplary graphical display for displaying weather information is a virtual windsock. The virtual windsock can be in correct compass orientation to an airport on the display. The display can be a North up or track up moving map display. FIG. 2A illustrates an exemplary track up moving map display 200 with a windsock 201, and FIG. 2B illustrates an exemplary North up moving map display 202 with a windsock 203. The virtual windsock enables the pilot to know the wind direction in exact relationship to the airport. Alternately, the windsock can be displayed without a reference to the airport. In either case, the windsock's direction would be relative to the compass orientation on the display.

Pilot safety can further be enhanced by prompting the pilot to adjust the altimeter according to barometric information from the nearest ground station. Utilizing the navigation system 116, the MMDS radio 106 can automatically switch to a nearby station, as discussed above, to thus enable continuous updates of local barometric pressure readings. Again, the MMDS radio 106 can be tuned to receive a particular signal being broadcast based on proximity to the aircraft and/or the destination airport, strength, or any one or more other factors. Alternatively, the radio 106 can be tuned to receive the strongest broadcast signal. This enables the airplane's altimeter to be promptly updated at any time with the most accurate barometric data. The display can prompt the pilot to update the altimeter. The altimeter can be updated when a settable threshold of barometric change has been reached and/or when a predetermined amount of time has lapsed. Other data that can be considered when updating the altimeter can include proximity to origin airport, the proximity to flightplan waypoint airports, and the altitude change or proximity to the destination airport. The altimeter can be updated automatically.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of providing visual data to a pilot in an aircraft, said method comprising:
   making an onboard determination of a geographical position of the aircraft;
   identifying at least one transmitting radio frequency (RF) channel carrying weather information, wherein identifying is based upon proximity to the geographical position as determined on board the aircraft;
   auto-tuning an onboard transceiver to the identified RF channel;
   receiving weather information at the transceiver, the weather information comprising a voice signal from the identified RF channel, wherein the voice signal conveys at least the weather information;
   converting the voice signal conveying the weather information to visual data; and
   displaying the visual data to the pilot.

2. The method of claim 1, wherein the geographical position is based on GPS data.

3. The method of claim 1, wherein the displaying visual data step comprises:
   displaying visual representations of at least one of wind speed, wind direction, precipitation, barometric pressure, air temperature, humidity, time information, and weather warnings.

4. The method of claim 1, wherein the displaying step comprises:
   displaying a virtual windsock.

5. The method of claim 1, wherein the receiving step includes receiving the weather information over a multi channel COM radio channel.

6. The method of claim 1, wherein the weather information includes barometric pressure information, and wherein the method further comprises updating an aircraft altimeter with the barometric pressure information.

7. The method of claim 1, wherein the weather information includes information concerning at least one of potential icing condition, area storms, high winds, and tornadoes.

8. The method of claim 1, wherein the at least one transmitting RF channel is a plurality of transmitting channels, and wherein the visual data displayed to the pilot represents weather conditions.

9. A system for providing visual data to a pilot in an aircraft, comprising:
   an onboard navigation system operable to determine a geographical position of the aircraft;
   an onboard receiver operable to identify at least one transmitting channel carrying voice weather information in proximity to the aircraft using the determined geographical position of the aircraft determined by the onboard navigation system, operable to auto-tune the onboard receiver to a transmission of the at least one identified transmitting channel, and operable to receive the transmission with at least weather information conveyed in the form of a voice signal;
   a converter operable to convert the voice signal weather information to visual data; and
   a display operable to display the visual data to the pilot.

10. The system of claim 9, wherein the navigation system includes a GPS receiver.

11. The system of claim 9, wherein visual data includes representations of at least one of wind speed, wind direction, precipitation, barometric pressure, air temperature, humidity, time information, and weather warnings.

12. The system of claim 11, wherein the representation is a virtual windsock.

13. The system of claim 9, wherein the receiver includes a multi channel COM radio.

14. The system of claim 9, wherein the weather information includes barometric pressure information.

15. The system of claim 9, wherein the weather information includes information concerning at least one of potential icing condition, area storms, high winds, and tornadoes.

16. The system of claim 9, wherein the at least one transmitting channel is a plurality of transmitting channels, and wherein the visual data displayed to the pilot represents weather conditions.

17. A system for providing visual data to a pilot in an aircraft, comprising:
   onboard means for ascertaining a geographical position of the aircraft;
   means for identifying at least one transmitting channel carrying weather information using the geographical position as determined on board the aircraft;
   means for auto-tuning an onboard transceiver to the at least one identified transmitting channel;
   means for receiving weather information from the at least one identified transmitting channel, wherein the weather information is in the form of a voice signal;

means for converting the weather information voice signal to visual data; and means for displaying the visual data to the pilot.

18. The method of claim 1, wherein converting the voice signal conveying the weather information to visual data comprises:

converting the voice signal conveying the weather information using voice recognitions software.

19. The system of claim 9, further comprising:

voice recognitions software operable to convert the voice signal conveying the weather information.

20. The system of claim 17, wherein the means for converting converts the voice signal conveying the weather information using voice recognitions software.

* * * * *